United States Patent [19]
Ward

[11] Patent Number: 5,203,613
[45] Date of Patent: Apr. 20, 1993

[54] RESTRAINING DEVICES COMBINED WITH SUPPORT AND METHOD OF SECUREMENT ADJACENT A CROTCH POST

[76] Inventor: Susan P. Ward, RR#3 Box 409, 2550 River Rd., Manotick, Ontario, Canada, K0A 2N0

[21] Appl. No.: 696,998

[22] Filed: May 3, 1991

Related U.S. Application Data

[63] Continuation-in-part of Ser. No. 482,759, Feb. 21, 1990, abandoned.

[51] Int. Cl.⁵ .............................................. A47D 15/00
[52] U.S. Cl. .................................... 297/485; 297/484; 297/467; 280/808
[58] Field of Search ............... 297/484, 485, 465, 219, 297/254, 276, 277, 278, 279, 464, 465, 466, 468, 470, 471, 472, 483, 484, 485, 486, 467; 280/808; 2/310, 311, 312, 340, 230; 24/298, 302, 200, 182

[56] References Cited

U.S. PATENT DOCUMENTS

| | | |
|---|---|---|
| 219,252 | 6/1922 | Dunning . |
| 293,185 | 9/1929 | Losey . |
| 1,332,328 | 3/1920 | Fischer ................. 297/485 |
| 2,077,244 | 4/1937 | Le Roy ..................... 182/3 |
| 2,365,625 | 12/1944 | Carisle ................. 297/484 |
| 2,413,395 | 12/1946 | Ware ................... 297/485 |
| 2,414,698 | 1/1947 | Picard ................. 297/484 |
| 2,564,564 | 8/1951 | Cookman ............... 2/310 |
| 2,851,033 | 9/1958 | Posey ................. 297/484 |
| 2,948,037 | 8/1960 | Bugyi ................. 2/340 X |
| 3,089,143 | 5/1963 | Jacobson ............... 116/28 |
| 3,612,605 | 10/1971 | Posey . |
| 4,204,695 | 5/1980 | Salzman . |
| 4,324,430 | 4/1982 | Dimas, Jr. et al. . |
| 4,550,800 | 11/1985 | Dietrich . |
| 4,561,676 | 12/1985 | Trubiano . |
| 4,568,125 | 2/1986 | Sckolnik ............... 297/467 |
| 4,637,622 | 1/1987 | Burgard . |
| 4,650,252 | 3/1987 | Kassai . |
| 4,795,216 | 1/1989 | Culver et al. . |
| 4,867,464 | 9/1989 | Cook . |

FOREIGN PATENT DOCUMENTS 114104  3/1918  United Kingdom .

Primary Examiner—Peter R. Brown
Assistant Examiner—James M. Gardner
Attorney, Agent, or Firm—Thomas Adams

[57] ABSTRACT

Problems encountered in adapting child restraint devices of the kind used to retain a child in the seat of a shopping cart, "stroller", dining chair, or like device, for use in different circumstances and with children of different sizes, are overcome by a restraining device which comprises a pair of straps, each having a releasable fastener at each end portion. The cooperating parts of the fastener are spaced apart lengthways so that when they are fastened the end portion will form a loop. In use, the straps are placed over a child's shoulders and crossed over each other both front and rear. The ends of the straps are attached to a belt secured around the child by looping the end portions around the belt and fastening the releasable fasteners. The restraining device conveniently restrains the child in the seat, the shoulder straps preventing it from wriggling upwards out of the waist belt. Because the straps are releasably attached to the belt, they can be used independently. For example, they can be attached to a belt which is already attached to the shoppingcart, "stroller" or the like to convert it into a more effective restraining device. Alternatively, the straps can be fastened directly to the frame of the device.

20 Claims, 3 Drawing Sheets

RESTRAINING DEVICES COMBINED WITH SUPPORT AND METHOD OF SECUREMENT ADJACENT A CROTCH POST

This is a continuation-in-part of U.S. patent application Ser. No. 482,759 filed Feb. 21, 1990, now abandoned.

FIELD OF THE INVENTION

This invention relates to restraining devices suitable for retaining a child in a seating compartment of a shopping-cart, a baby-carriage, so-called "stroller", high chair or the like.

BACKGROUND

A problem encountered by many mothers is that active children can injure themselves by climbing out of a shopping cart while the mother is distracted. Various restraining devices have been disclosed by people trying to solve this problem. Concerned that a child might be injured falling out of one of their shopping carts, some supermarket owners and shopping cart manufactures have provided safety devices. For example, U.S. Pat. No. 4,550,800 dated Nov. 5, 1985 discloses a shopping cart safety belt with an adjustable loop at one end, which is placed around the child's waist, and a snap fastener at the other end which is fastened to the shopping cart. A drawback of this kind of restraining device is that a child's buttocks generally are smaller than its torso, so the child can wriggle upwards out of the loop.

U.S. Pat. No. 4,324,430 dated Apr. 13, 1982 discloses a seat-like carrier which is attached to the shopping cart by straps and includes a series of straps to fasten around the child to secure it to the carrier and hence to the shopping cart.

U.S. Pat. No. 4,637,622 dated Jan. 20, 1987 discloses a strap or belt which is used as a cinch to pass through the bars of the shopping cart and around the waist of the child.

U.S. Pat. No. 4,204,695 dated May 27, 1980 discloses a collapsible child seat with a waist belt. The child is secured in the child seat by means of the waist belt and the child seat is installed in the seating compartment of the shopping cart.

U.S. Pat. No. 4,561,676 dated Dec. 31, 1985 discloses a shopping cart with a safety belt which is clipped to the seating compartment either side of the child and extends across the child's chest to secure it to the shopping cart.

U.S. Pat. No. 4,867,464 dated Sep. 19, 1989 discloses a shopping cart with a restraint in the form of a harness which extends around the child's waist with shoulder straps which extend over the child's shoulders from front to back. The waist belt and shoulder straps are passed around and through the bars of the shopping cart and fastened together to secure the child to the shopping cart.

These child restraint devices indicate that there is a need for a safe way to secure a child in a shopping cart but generally are not sufficiently secure because the child can wiggle out or are so complicated that they are unlikely to be used by the typical shopper who has neither time or patience. Many different customers must use the shopping carts and their children will be of all shapes and sizes so it is important that the child restraint be quick and easy to use.

Various other child restraining devices have been disclosed for use with baby carriages, chairs and the like.

U.S. Pat. No. 4,795,216 dated Jan. 3, 1990, discloses a child retaining device in the form of two flexible bands fastened together at their mid-points in cruciform manner. The crossover portion is placed between the child and the seat. Two ends extend upwards between the child's legs, around the child's hips and around the chair back. Behind the chair, they are fastened to the other ends. This child retaining device also suffers from the disadvantage that the child can wriggle upwards to free itself.

A baby carriage of the kind sometimes referred to as a "stroller" is disclosed in U.S. Pat. No. 4,650,252 dated Mar. 17, 1987. It comprises an annular belt to fit around the child's waist and a connecting section which connects the annular belt to the carriage so that the child cannot stand up. This kind of seat belt also suffers from the disadvantage that a child can wriggle upwards out of it.

U.S. Pat. No. 219,252 dated June 1922 discloses a safety strap for securely holding an infant in a baby carriage, chair or the like. It comprises a breast band and a pair of shoulder straps. The latter are attached to the breast band and connected to each other by a back strap. The shoulder straps pass under the child's armpits and over its shoulders. The two ends of each strap are fastened to the breast band at the front by means of a buckle type fastener. The breast band is then attached to the chair or baby carriage. A disadvantage of this kind of device is that the width of the back strap must be carefully adjusted if the child is not to wriggle out the shoulder straps. This is inconvenient and time consuming, especially if the safety belt is to be used for children of different shapes and sizes.

U.S. Pat. No. 293,185 dated September 1929 discloses a baby harness for holding an infant in a baby carriage. It comprises a belt which fits around the body of the infant and is secured to the baby carriage. A pair of belt supporting straps are fastened to the belt at their ends so as to extend over the shoulders of the infant. The supporting straps pass through retaining plates, one at the front and one at the back, which hold them in crossed relationship about the middle of the child's trunk. This kind of harness also suffers from the disadvantage that it is not easy to adjust to children of different sizes.

U.S. Pat. No. 3,612,605 dated Oct. 12, 1971 discloses a restraining device for restraining a patient in a chair. This comprises a belt and two shoulder straps which are fixedly attached to the belt at one end. Their free ends extend over the patient's shoulders and are attached to the belt behind the chair. Although such a device would restrain a child from wriggling upwards out of a waist belt, it would not be easy to adapt it for use in a variety of different circumstances and/or with children of different shapes and sizes.

Concerned that a child might be injured falling out of one of their shopping carts, some supermarket owners have tried providing safety devices but they were not used because they were not simple and easy to use and adjust. It will be appreciated that many different customers will use the shopping carts and their children will be of all shapes and sizes.

An object of the present invention is to provide a restraining device which is readily adapted for use with a variety of different seat-bearing devices, such as a shopping cart, a "stroller", or a dining (high) chair, and is easily adjusted to accommodate children of different shapes and sizes.

BRIEF SUMMARY OF THE INVENTION

According to one aspect of the invention there is provided a shopping cart, baby carriage, chair, or the like, comprising a seating compartment for an infant, said seating compartment being defined by a seat, a front frame member defining openings for the legs of an infant seated therein, a rear frame member spaced from the front wall and serving as a seat back, and opposing side frame members, and a pair of straps for retaining said infant in said seating compartment, said straps being of sufficient length to extend between said front and rear frame members and over the shoulders of said infant, crossing each other at least once, each said strap having releasable fastening means at least one end of said releasable fastening means comprising first and second cooperable parts spaced apart along the end portion such that the end portion forms a loop when the first and second parts are fastened together, the straps being releasably fastened to the shopping cart, chair or other seat-bearing article by looping said end portions around a respective one of said front and rear frame members.

Preferably, a crotch member extends between said seat and said front frame member so that the infant cannot slide through the front of the seating compartment.

In use, the straps are placed one over each of a child's shoulders. The straps cross over each other both front and rear. The straps may be looped around a frame member of the shopping-cart, baby carriage, or the like.

A series of the first or second parts of the releasable fastening means may be spaced at intervals along the strap. This allows the size of the loop, and hence the effective length of the strap, to be adjusted by using different ones of the series of fastener parts.

Preferably, the releasable fastening means comprises snap fasteners.

Alternatively, adjustment may be provided by means of a clip of the kind used for suspenders, slidably mounted on the strap, one end of the strap being fastened to the clip.

Each end portion may comprise a loop releasably attached to the remainder of said strap.

For convenience, the two straps may be held together by means of a clip, rivet, stitching, Velcro (Trade Mark) or the like which, in use, would be positioned about the middle of the child's back.

One embodiment of the invention comprises a restraining device comprising a pair of straps, each strap having releasable fastening means at each end portion thereof, each releasable fastening means comprising first and second cooperable parts spaced apart along the end portion such that the end portion forms a loop when the first and second parts are fastened together, each said end portion being looped around said frame and the cooperating fastener parts being fastened together.

According to a second aspect of the invention, a method of restraining an infant in a seating compartment of a shopping cart, baby carriage, chair or the like, said seating compartment being defined by a seat, a front frame member having openings for the legs of an infant seated therein, a rear frame member spaced from the front frame member and serving as a seat back, and opposing side frame members, at least the front and rear frame members comprising at least one elongate frame member, said method comprising the steps of:

releasably attaching one end of each of a pair of straps around one of said frame member and said rear frame member by looping one end portion of each strap around the frame member and releasably fastening said one end portion to the strap;

crossing the straps behind the torso of the person and extending one strap over each shoulder of the person;

crossing the straps in front of the torso of the person;

attaching the other end portion of each of the pair of straps around the belt by looping said other end portion of each strap around the other of said front frame member and said rear frame member and releasably fastening said other end portion to the strap.

BRIEF DESCRIPTION OF THE DRAWINGS

Embodiments of the invention will now be described, by way of example only, with reference to the accompanying drawings.

DETAILED DESCRIPTION OF A PREFERRED EMBODIMENT

Figure 1:
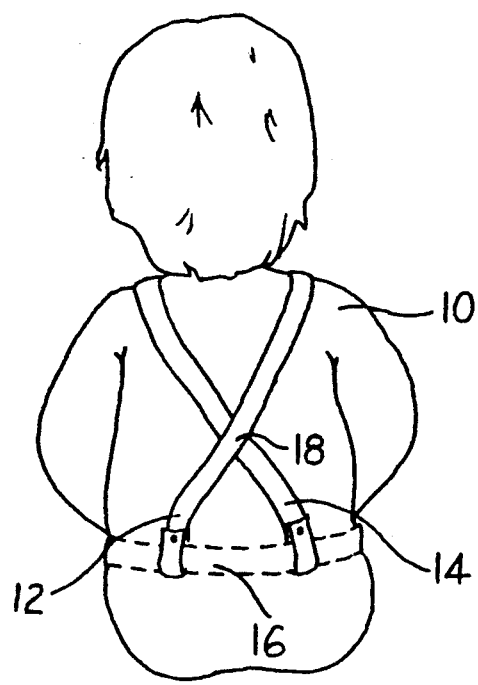
FIG. 1 is a rear view of a child with a restraining device.

Referring to FIG. 1, a infant 10 is shown wearing a restraining device comprising a pair of straps 12 and 14, of nylon webbing, fastened at their ends to a waist belt 16 around the infant's waist. The belt 16 is shown in broken lines to signify that, in this embodiment at least, it is an existing belt already fixed to a shopping cart. The ends of straps 12 and 14 may be fastened instead to a horizontal frame member 16' (see FIG. 3) of a shopping cart, infant carriage or infant seat, as will be described more fully later.

Figure 2:
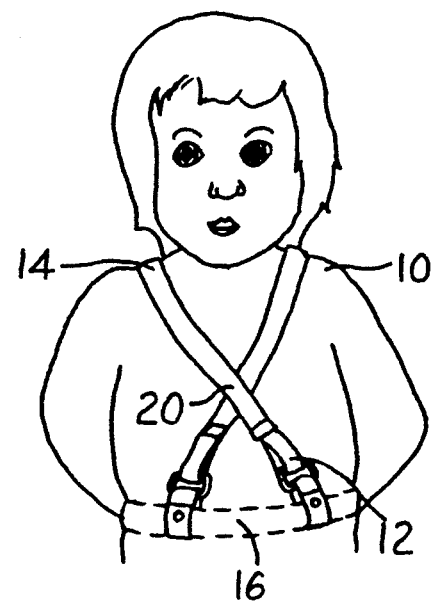
FIG. 2 is a front view of the child.

The straps 12 and 14 cross over each other in the middle of the child's back and are secured together by means of a rivet 18, or stitching, buckles, snap fastener or other means of attaching them as a unit 18, and then extend one over each shoulder. At the front, the straps 12 and 14 cross over each other again, as indicated at 20 in FIG. 2, before being attached to belt 16 or frame member, 16 of a seating compartment (see FIG. 1 or FIG. 3).

Figure 3:
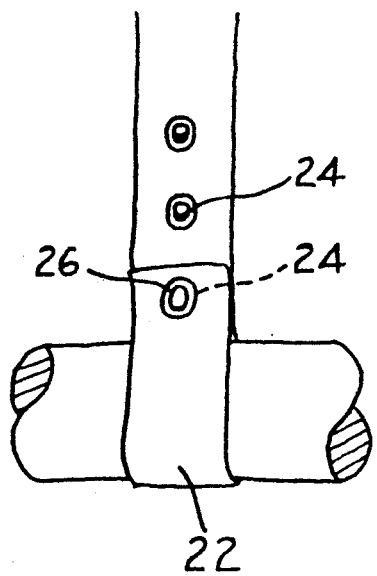
FIG. 3 is a detail view of an end portion of a strap of the restraining device showing how it is attached to a frame member.

The end portions of the straps 12 and 14 are attached to the belt or frame member 16 so as to be readily releasable, as illustrated in detail in FIG. 3. The end portion 22 of the strap has releasable fastener means in the form of a series of male snap fastener parts 24 spaced along the length of the end portion and a female fastener part 26 adjacent to the end of the end portion 22. The size of the loop, and hence the overall length of the strap 12, can be adjusted by fastening the female part 26 to a different one of the male fastener parts 24.

Figure 4:
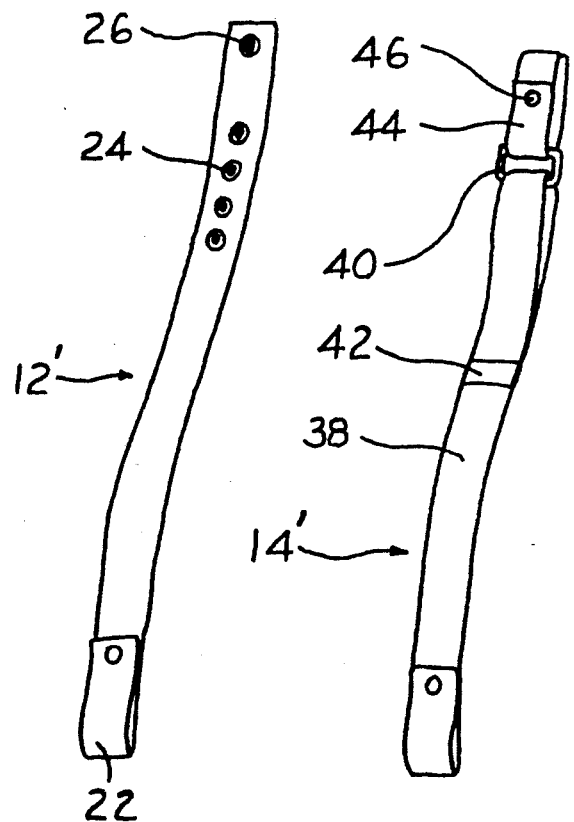
FIG.4 is a detailed view of two straps, one having an one end portion as shown in FIG. 3 and the other having an alternative form of end portion.

FIG. 4 shows two straps 12' and 14'. Strap 12' has one end portion configured in the way shown in FIG. 3, and the other end has a single snap fastener. Strap 14' has an alternative form as shown also in FIG. 2. A main strap portion 38 is looped around a coupling ring 40 and then attached to an adjustable clasp, buckle or clip 42, of the kind used for suspenders, which is slidable along the strap portion 38 to adjust its length. End portion 44 is a shorter loop of the same nylon webbing as the main strap portion 38 and also is looped around the ring 40. The end portion 44 is stitched or rivetted as indicated at 45 to secure it to the ring 40 and has snap fasteners 46 for fastening it in a loop, as previously described, around the frame member 16. The clasp 42 could be replaced by other adjustment means, for example a buckle.

An advantage of embodiments of the invention is that the restraining device can readily be adapted to different situations and for use with children of different sizes.

Figure 5:
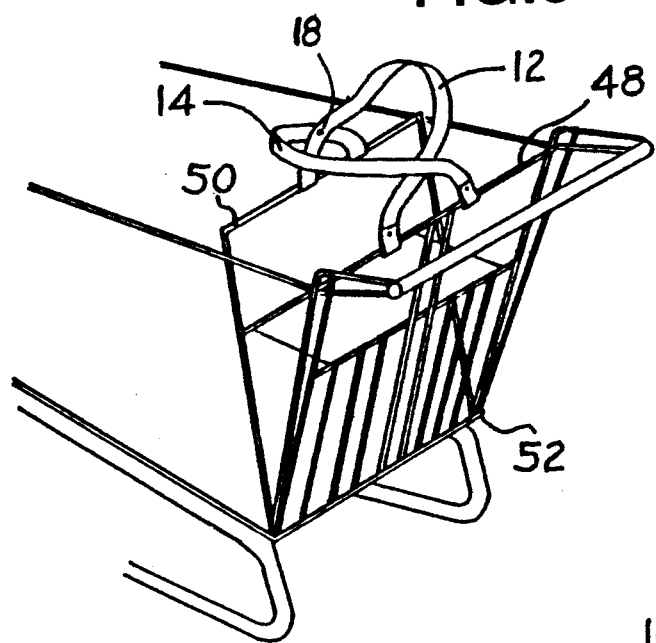
FIG. 5 illustrates the restraining device attached to a shopping cart.
Figure 6:
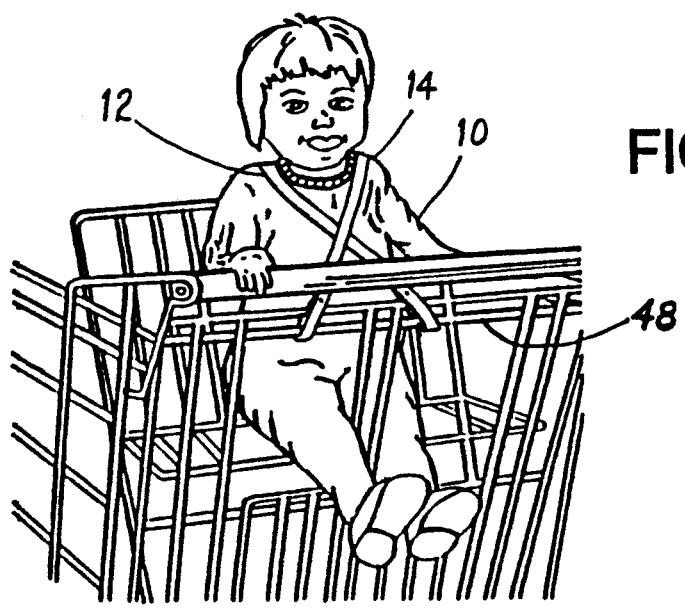
FIG. 6 illustrates the device in use with a child seated in the seating compartment of the shopping cart.
Figure 7:
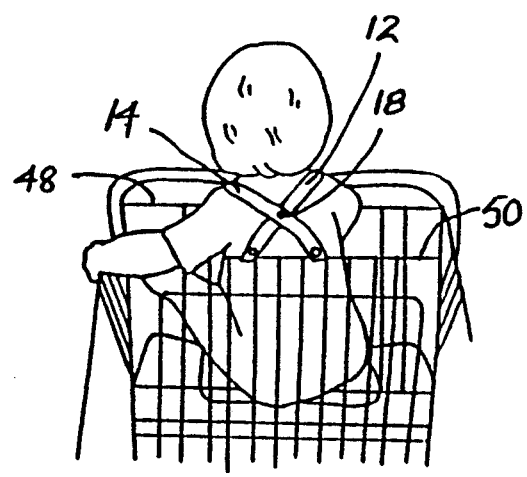
FIG. 7 corresponds to FIG. 6 showing the child from the rear.

FIGS. 5, 6, and 7 illustrates a situation where the shoulder straps 12 and 14 are attached directly to horizontal frame members 48 and 50 at the front and rear, respectively, of the seating compartment of a shopping cart 52. Preferably the loops are fastened so that the ends of the shoulder straps are towards the child's body so that they are more difficult for the child to unfasten.

Figure 8:
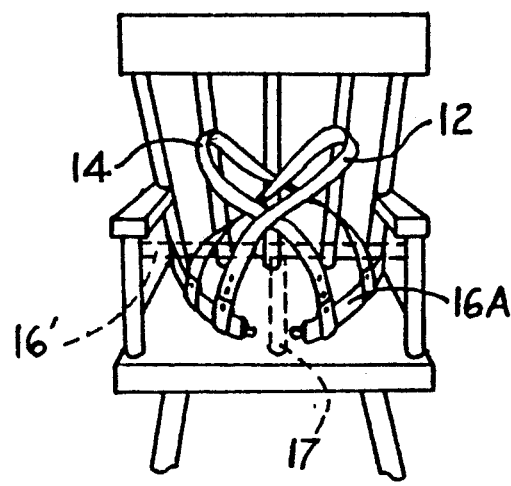
FIG.8 illustrates a pair of these straps attached to a dining or high chair having frame, members forming a seating compartment
Figure 9:
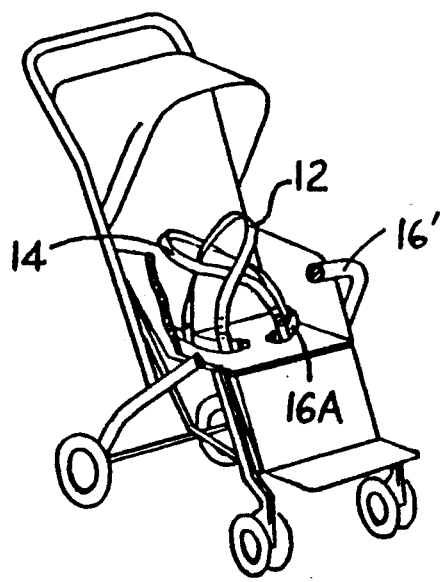
FIG.9 illustrates a pair of the straps attached to a "stroller" having frame members forming a seating compartment.

FIGS. 8 and 9 illustrate use of the straps with other devices which have seats, namely a dining chair of the kind known as a "high-chair" and a so-called "stroller", both of which have a waist belt attached. As illustrated, the two straps 12 and 14 are attached at opposite extremes of each half of the waist belt 16A. One end of each strap is first fastened to the belt 16A near where it is fastened to the seat back, and the other end is passed over the child's shoulder before fastening at the front as previously described.

If the dining chair or stroller has a horizontal frame member extending across the front and a crotch member 17, as illustrated in in broken lines in FIG. 8, member or strap joining it to the seat to prevent the child sliding out forwards, the straps 12 and 14 can be used in a manner analogous to that of the shopping cart by fastening them to the back of the chair or stroller and looping them around the front frame member 16'.

Figure 10:
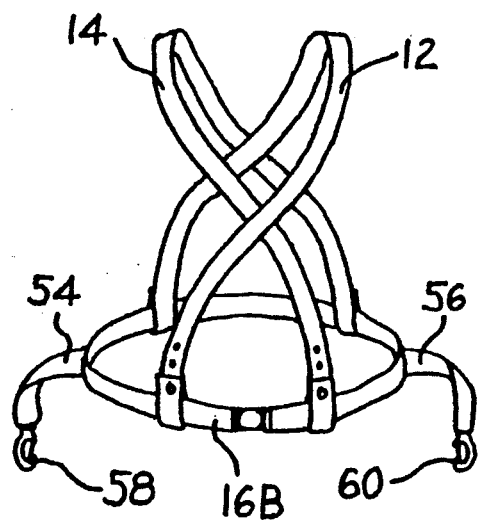
FIG. 10 illustrates a pair of the shoulder straps fastened to a waist belt to form a harness.

As shown in FIG. 10, the straps 12 and 14 may be fastened to a waist belt 16B to form a harness, but readily unfastened and used separately with a shopping cart, infant carriage or infant chair. Belt extensions 54 and 56, respectively, attached to the waist belt 16B, have spring clips 58 and 60, respectively, for attaching to a frame member of a shopping cart or other seat bearing device.

Thus, the invention encompasses a child restraint device which can be used in several different situations and yet is simple, easy to fit and adjust, and safe.

It is envisaged that embodiments of the invention could be used with other devices which have seats, for example swings, infant seats, and so called "booster seats" which fit onto a conventional dining chair. In the latter case, the waist belt 16A would extend around the chair back. In the case of a shopping cart without an existing belt, the waist belt could be threaded through the bars of the cart before the straps were fastened, which would ensure that the child could not stand up.

The two straps could be fastened permanently to the shopping cart, stroller, dining chair or other such device, conveniently by rivets or other fasteners which are permanent or not readily released, so that they would not get lost or misplaced. It will be appreciated that only one end of each strap would be fixed, to either the front or back of the seating compartment, and the other end would still be releasably fastened. Preferably the fixed ends would be in front of the child so that it could not undo the fastenings.

Although snap fasteners are the preferred form of fastening means, other fasteners are of course envisaged and embraced by the invention. For example, hook and loop fasteners of the kind marketed under the trade mark VELCRO could be used, providing care was taken to ensure that their efficiency did not deteriorate as a result of lint accumulating during washing. Either one of the hook portion and the loop portion could be extended so that the other portion could be fastened at different positions along its length to allow for adjustment of the length of the strap.

The foregoing constitutes the best mode of performing the invention presently contemplated. It will be clear to one skilled in the art that it is susceptible of various modifications without departing from the scope of the invention which is defined by the following claims.

I claim:

1. A shopping cart having a seating compartment for an infant, said seating compartment formed by a seat, a seat back, opposite sides and a front, said front comprising a horizontal member extending between said sides and a crotch member extending between said seat and a middle of said horizontal member, said crotch member, horizontal member, seat and sides defining openings either side of said crotch member for the legs of an infant seated in the seating compartment, and a pair of shoulder straps attached by their respective first ends to one of said seat back and said horizontal member, said shoulder straps having sufficient length to extend over the shoulders of an infant seated in said seating compartment and attach at their respective other ends to the other said seat back and said horizontal member, crossing at least once, said other ends of said shoulder straps having releasable fastening means for attachment to said other of said seat back and said front horizontal member, said seat, seat back, sides, horizontal member, crotch member, and shoulder straps cooperating, in use, to retain the infant in said seating compartment, said seat, sides, front and seat back preventing egress of the infant in any direction other than upwards, and said shoulder straps preventing egress upwards.

2. A shopping cart as claimed in claim 1, wherein said first ends of said shoulder straps are fixedly attached to said one of said seat back and said horizontal member.

3. A shopping cart as claimed in claim 2, wherein said first ends are attached to said horizontal member.

4. A shopping cart as claimed in claim 1, wherein said first ends of of said shoulder straps are releasably attached to said one of said seat back and said horizontal member.

5. A shopping cart as claimed in claim 1, wherein said releasable fastening means comprise snap fasteners.

6. A shopping cart as claimed in claim 1, wherein each strap further comprises adjustment means for adjusting the length of the strap.

7. A shopping cart as claimed in claim 6, wherein said adjustment means comprises a clip slidably mounted upon the strap, one end of the strap being attached to said clip.

8. A shopping cart as claimed in claim 1, wherein said strap comprises a loop attached to a body portion of said strap and having said releasable fastening means.

9. A shopping cart as claimed in claim 8, wherein said releasable fastening means comprises a series of said parts arranged such that selection of different parts varies the size of the loop and therewith the effective length of the strap.

10. An infant carriage or infant chair having a seating compartment for an infant, and seating compartment formed by a seat, a seat back, opposite sides and a front, said front comprising a horizontal member extending between said sides and a crotch member extending between said seat and a middle of said horizontal member, said crotch member, horizontal member, seat and sides defining openings either side of said crotch member for the legs of an infant seated in the seating compartment, and a pair of shoulder straps attached by their respective first ends to one of said seat back and said horizontal member, said shoulder straps having sufficient length to extend over the shoulders of an infant seated in said seating compartment and attach at their respective other ends to the other of said seat back and said horizontal member, crossing at least once, said other ends of said shoulder straps having releasable fastening means for attachment to said other of said seat back and said front horizontal member, said seat, seat back, sides, horizontal member, crotch member, and shoulder straps cooperating, in use, to retain the infant in said seating compartment, said seat, sides, front and seat back preventing egress of the infant in any direction other than upwards, and said shoulder straps preventing egress upwards.

11. An infant carriage or infant chair as claimed in claim 10, wherein said first ends of said shoulder straps are fixedly attached to said one of said seat back and said horizontal member.

12. An infant carriage or infant chair as claimed in claim 11, wherein said first ends are attached to said horizontal member.

13. An infant carriage or infant chair as claimed in claim 10, wherein said first ends of said shoulder straps are releasably attached to said one of said seat back and said horizontal member.

14. A shopping cart as claimed in claim 10, wherein the releasable fastening means comprise snap fasteners.

15. An infant carriage or infant chair as claimed in claim 10, wherein each strap further comprises adjustment means for adjusting the length of the strap.

16. An infant carriage or infant chair as claimed in claim 15, wherein said adjustment means comprises a clip slidably mounted upon the strap, one end of the strap being attached to said clip.

17. An infant carriage or infant chair as claimed in claim 10, wherein each of said straps comprises a loop attached to a body portion of said strap and carrying said releasable fastening means.

18. An infant carriage or infant chair as claimed in claim 17, wherein said releasable fastening means comprises a series of said parts arranged such that selection of different parts varies the size of the loop and therewith the effective length of the strap.

19. A method of restraining an infant in a seating compartment of a shopping cart, infant carriage, or infant chair, using a pair of shoulder straps, said seating compartment comprising a seat, a seat back, opposite sides and a front, said front comprising a horizontal member extending between said sides and a crotch member extending between said seat and a middle of said horizontal member, said crotch member, horizontal member, seat and sides defining openings either side of said crotch member for the legs of an infant seated in said seating compartment, said method comprising the steps of:

attaching respective first ends of said pair of shoulder straps to one of said seat back and said horizontal member;

extending said straps over respective shoulders of said infant, crossing at least once; and attaching respective other ends of said straps to the other of said seat back and said horizontal member, such that said seat, seat back, sides, horizontal member, crotch member, and shoulder straps cooperate to retain the infant in said seating compartment, said seat, sides front and seat back preventing egress of the infant in any direction other than upwards, and said shoulder straps preventing egress upwards.

20. A method as claimed in claim 19, wherein the step of attaching comprises releasably attaching said first ends to said one of said seat back and said horizontal member.

* * * * *